United States Patent [19]

Ryan et al.

[11] Patent Number: 4,949,088
[45] Date of Patent: Aug. 14, 1990

[54] SYSTEM FOR IDENTIFYING DISTANCE AND RANGE BETWEEN A RADAR SOURCE AND A VEHICLE

[76] Inventors: Thomas M. Ryan; Karen Ryan, both of 19925 SW. 62nd La., Dunnellon, Fla. 32630

[21] Appl. No.: 396,372
[22] Filed: Aug. 21, 1989
[51] Int. Cl.⁵ .......................... G01S 7/36; G01S 7/42
[52] U.S. Cl. ...................................................... 342/20
[58] Field of Search ........................................... 342/20

[56] References Cited

U.S. PATENT DOCUMENTS 1,801,466  4/1931  Townsend .
3,233,217  2/1966  Bost .
3,956,749  5/1976  Magorian .
4,404,561  9/1983  Mulder .
4,532,515  7/1985  Cantrell .
4,713,768  12/1987  Kosaka .
4,801,938  1/1989  Holmes .
4,818,997  4/1989  Holmes .

Primary Examiner—Theodore M. Blum
Attorney, Agent, or Firm—Terry M. Gernstein

[57] ABSTRACT

A system includes units for identifying the location and range of a radar signal source relative to a user's vehicle. The system also includes an alarm unit for signalling if the radar source is within a prescribed distance from the vehicle. A readout and display unit displays selected information from the various units of the system.

3 Claims, 2 Drawing Sheets

SYSTEM FOR IDENTIFYING DISTANCE AND RANGE BETWEEN A RADAR SOURCE AND A VEHICLE

TECHNICAL FIELD OF THE INVENTION

The present invention relates to the general art of signal detection, and to the particular field of radar detectors.

BACKGROUND OF THE INVENTION

In recent times, the art of signal detection has seen a rapid increase in systems and devices for detecting radar signals. These radar detectors range from simple detectors to fairly sophisticated devices which are capable of detecting several different types of radar signals.

All of the known devices work within a limited range, and knowing such range is of some value to a user. Some of the known devices even provide range information to the user.

However, it may also be helpful to the user to know location as well as range. That is, it may be helpful to a user to know the angular location of a radar source relative to a detector in addition to knowing the distance between that source and the detector.

Therefore, there is a need for a radar detector system which will provide locational information in addition to range information.

OBJECTS OF THE INVENTION

It is a main object of the present invention to provide a radar detector system which will provide locational information in addition to range information.

SUMMARY OF THE INVENTION

This, and other, objects are achieved by a radar detector system that includes a system for providing range information as well as a system for providing angular orientation of the radar signal source with respect to the radar detector. This information is provided to the user by a digital readout device. A further signal system is coupled to the location and range systems to sound a separate signal if the source is within a prescribed range.

DETAILED DESCRIPTION OF THE PREFERRED EMBODIMENT OF THE INVENTION

Figure 1:
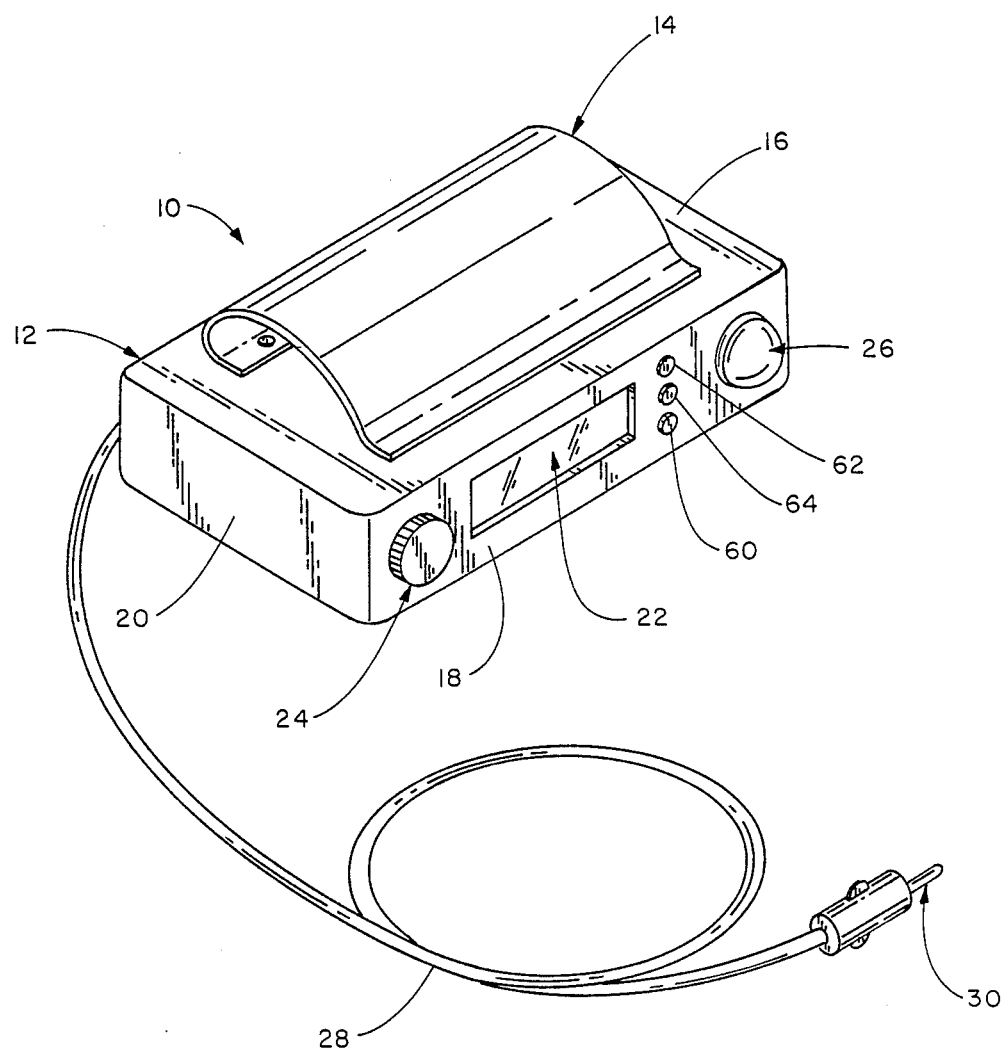
FIG. 1 is a perspective view of a radar detector which provides range and locational information abot a source of a radar signal.

Shown in FIG. 1 is a radar detector system display unit 10 embodying the present invention. The display unit 10 includes a housing 12 that includes a clip 14 for attaching the housing to a suitable element in a convenient location in the user's vehicle. The housing includes a top 16, side walls 18 and end walls 20. One side wall serves as a front wall and has a readout window 22 defined therein to be located between a control knob 24 and a signal indicator 26. The signal indicator will be discussed in greater detail below, and the control knob 24 can be an on/off switch or a volume control for the various audible signals included in the system. The detector display unit also serves as a power control unit to deliver power to the various elements of the system from a source of power, such as a vehicle battery via a cigarette lighter or the like via a power cable 28 and an attachment element 30.

Figure 2:
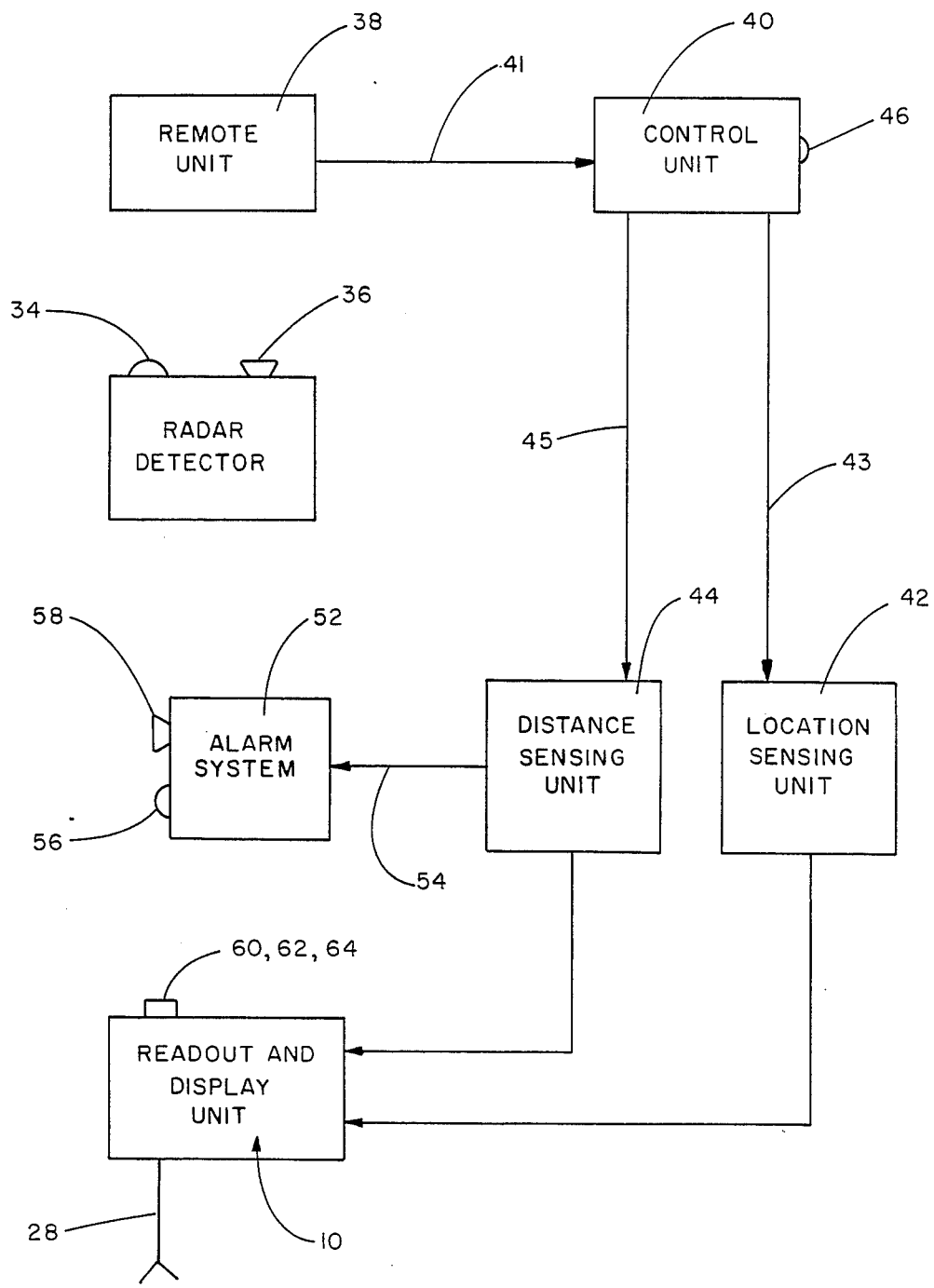
FIG. 2 is a schematic diagram of the system of the present invention.

Referring to FIG. 2, it is seen that the system of the present invention includes a conventional radar signal detector 32 such as manufactured by companies such as Cincinnati Microwaves Escort, or the like. This detector 32 is located at any convenient position in the user's vehicle, such as beneath the dashboard or the like, and detects radar signals in the usual manner.

The radar detector 32 has a visual signal indicator 34 and an audio signal indicator 36 to indicate the receipt of a radar signal. The signal from either or both of these indicators is received by a remote unit 38 such as disclosed in U.S. Pat. Nos. 4,801,938 and 4,818,997, the disclosures of which are incorporated herein by reference. This remote unit 38 is connected to a control unit 40 via a line 41, and transfers a signal generated upon receipt of a signal from either element 34 or element 36 of the radar detector 32 thereto.

The control unit 40 then activates either a location sensing unit 42 via a line 43 or a distance sensing unit 44 via a line 45 depending upon the setting of control knob 46 on that control unit. The circuitry used to select either unit 42 or unit 44 is conventional and thus will not be discussed.

The location sensing unit 42 determines the angular position of the radar signal source relative to the user's vehicle in the manner of the devices and systems disclosed in U.S. Pat. Nos. 3,956,749, 4,404,561, 4,532,515 and 4,713,768, the disclosures of which are incorporated herein by reference, as well as other such disclosures. For example, the system disclosed in the incorporated Pat. No. 4,404,561 includes a measuring circuit for measuring the phase difference between two received signals which can include a radar signal to determine the elevation, and hence the angular placement, of a target relative to the receiver. The unit 42 can include two receiving units connected to receiving channels, phase detectors, MITI filters and phase measuring circuits as discussed in the referenced patent, and thus operates signals received by those reciving units in on a manner similar to that manner disclosed in the referred patent to determine the angular location of a radar signal source relative to that unit, and hence relative to the user's vehicle.

The unit 42 generates a locational information signal which is transferred to the readout and display unit for readout on the display screen 22 via a lead, such as lead 48.

The system also includes the distance sensing unit 44 which is similar to those units disclosed in the incorporated U.S. Pat. No. 4,801,938. The unit 44 provides a signal according to the distance between that unit and the radar signal source, and such signal is sent to the readout and display unit 10 for display on the screen 22 via a line 50. This signal is also sent to an alarm unit 52 via a line 54. The alarm unit 52 includes Wheatstone Bridge type circuitry and emits a signal, either visual via a visual element 56 or audible via an audible element 58 when the distance between the radar signal source and the unit 44 is within a prescribed range. This will warn a user that a radar signal source is quite close.

Referring back to FIG. 1, the readout and display unit 10 includes a set of selector switches 60, 62 and 64 whereby the readout from units 42 and 44 respectively can be displayed and the alarm unit 52 can be activated and controlled via switch 64.

The signal indicator 26 includes a plurality of light colors effected by LEDs operating according to the principles disclosed in patents, such as U.S. Pat. No. 4,388,589, the disclosure of which are incorporated herein by reference, to indicate which signal, the distance or location, is being displayed. For example, if the signal light 26 is red, the display will be range, and if the signal light is green, the display will be angular location, and if the signal light is amber, the display will be alternating between range and location. The various selector switches can also include lights corresponding in color to the various colors of the signal light 26.

It is understood that while certain forms of the present invention have been illustrated and described herein, it is not to be limited to the specific forms or arrangements of parts described and shown.

I claim:

1. A system for identifying location and range of a radar unit source comprising:
   (A) a radar detector unit;
   (B) a remote unit operatively coupled to said radar detector unit to be activated upon said radar detector unit detecting a radar signal from a source;
   (C) a control unit connected to said remote unit to be activated by said remote unit;
   (D) a distance sensing unit connected to said control unit to detect the distance between said radar detector and the source upon being activated by said control unit;
   (E) a location sensing unit connected to said control unit to detect the angular location of the source with respect to said radar detector upon being activated by said control unit;
   (F) a readout and display unit connected to said distance sensing unit and to said location sensing unit; and
   (G) an alarm unit connected to said distance sensing unit to emit an alarm signal when said distance sensing unit detects a radar signal source located within a prescribed distance from said distance sensing unit.

2. The system defined in claim 1 further including a selector switch on said readout and display unit.

3. The system defined in claim 2, wherein said readout and display unit further includes a multi-colored signal element.

* * * * *